(No Model.)
C. STROEBEL.
REVERSIBLE PLOW.
No. 562,048. Patented June 16, 1896.
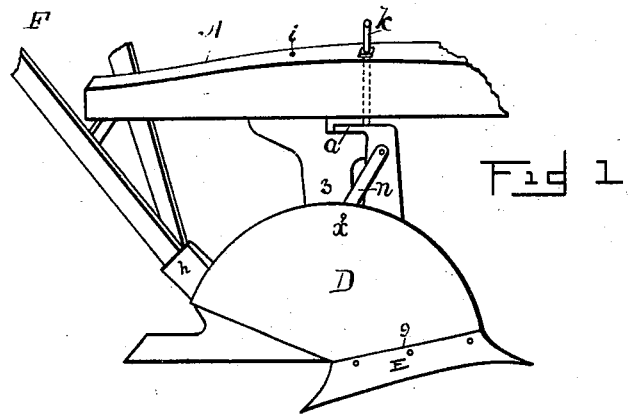
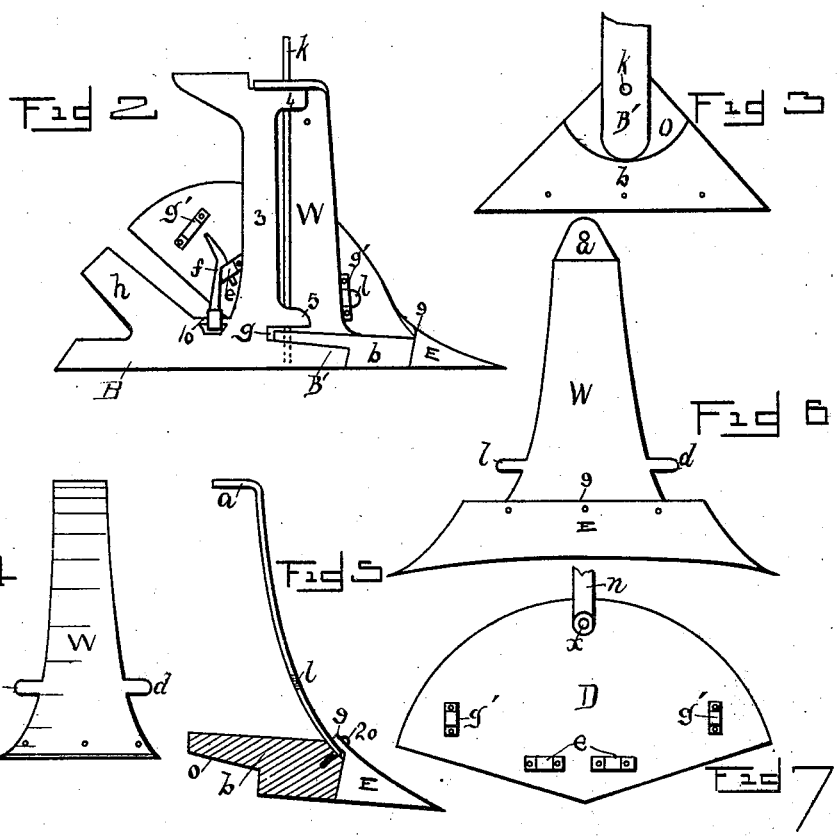
WITNESSES:
INVENTOR
Conrad Stroebel
BY
ATTORNEY.

UNITED STATES PATENT OFFICE.

CONRAD STROEBEL, OF OMAHA, NEBRASKA.

REVERSIBLE PLOW.

SPECIFICATION forming part of Letters Patent No. 562,048, dated June 16, 1896.

Application filed May 3, 1894. Serial No. 510,001. (No model.)

*To all whom it may concern:*

Be it known that I, CONRAD STROEBEL, a citizen of the United States, residing at Omaha, in the county of Douglas and State of Nebraska, have invented certain new and useful Improvements in Reversible Plows, of which the following is a specification.

This invention has relation to a new and novel improvement in reversible plows, the object being to provide a plow adapted for table-land as well as for what is called "hillside" plowing and which shall be so arranged that the operator can plow a furrow upon the side of a hill and when at the end of the furrow reverse his plow and plow in the opposite direction, which of course would be impossible with a plow as ordinarily constructed.

In the accompanying drawings, Figure 1 shows a partly perspective view of a plow embodying my invention, showing a front or face view of the moldboard. Fig. 2 shows a side elevation disclosing a rear view of the moldboard. Fig. 3 shows a bottom view of the turret-plate. Fig. 4 shows a front view of the face-plate. Fig. 5 shows a side elevation, partly in section, of the face-plate as secured to the turret-plate. Fig. 6 shows a partly perspective view of the face-plate connected to the duplex plowshare, while Fig. 7 shows a rear view of the duplex moldboard.

A represents a plow-beam of any suitable size and configuration, which is provided with the usual guiding-handles F. The base of my plow comprises, essentially, a narrow beam-casting B, provided in front with an extending shoe B', an upwardly-extending stem 3, and a socket $h$, adapted to receive the handles F. One side of the stem 3 is provided with two ears, (marked 4 and 5, respectively,) as is clearly shown in Fig. 1. The plow-beam A is secured by means of the bolt I to the stem 3, the bolt I passing into the upper end of said stem.

Pivotally mounted upon the stem and secured to the ears 4 and 5 is my reversible turret, comprising the base-plate $b$, the face-plate W, and the upper plate $a$, turned over at right angles to the face-plate.

Secured to the turret-plate W is my duplex plowshare E, which in Figs. 1 and 6 is shown as secured to the pivoted turret-plate. This duplex plowshare in front view in outline appears in the form of a truncated cone, the upper edge being separated from the moldboard by the line $u$ and $v$, as is shown in Fig. 1. This duplex plowshare is secured to the revolving turret-plate, which is detachably secured to the stem 3 by means of a bolt $k$, which passes through an opening of the plow-beam A and extends through the plates $a$ and $b$ as well as the ears 4 and 5, as is clearly shown in Fig. 2. By this means the turret-plate is permitted a movement of more than ninety degrees.

The bottom of the turret-plate $b$ is provided with an offset O, within which the forward shoe B' works, the bolt $k$ passing through this offset and shoe B', a bottom view being shown in Fig. 3, where also is shown a bottom view of the turret-plate $b$.

Depending from the stem 3 is a toggle $n$, which is secured to my duplex moldboard D by means of the pin $x$. This duplex moldboard in outline is in the shape of a sector having two equal bases. This duplex moldboard is connected to the plow by means of the toggle-bar $n$, and upon the rear is provided with the ears $g'$ $e$ and the central ear $e$, as is clearly shown in Fig. 2. Now to use this it is optional with the user whether he arranges the plow so that the moldboard is upon the right side or upon the left side, as the pivoted turret-plate permits adjustment in either direction. In Figs. 1 and 3, for instance, the plow has been shown with the moldboard adjusted in Fig. 1 upon the right side and in Fig. 3 upon the left side. In adjusting the plow so that the left side and turret-plate are carried to the left their full distance, which is ninety degrees, the strap $c$, carrying the locking-bar $f$, is made to lock over the projecting ear $e$ of the turret-plate from such a position that the lines $s$ and $t$ form a continuation of the upper end of the share E. This locking of the combined turret-share, moldboard, and plowshare by means of a T-shaped locking-bar $f$, to which is pivotally secured the beam-casting B, is clearly shown in Fig. 2. By swinging one stem of this T-shaped bar into the eye $e$ the plow is locked upon the left side. The unlocking of this combination can be instantly accomplished by simply swinging the turret to the right, then readjusting the moldboard, when the bar f is swung to the adjusted side, so that the stem locks the parts then being in the position as shown in Fig. 2.

The device is noticeable because of its simplicity. The working effects are accessible, and instrumentalities are adjustable, and the plow is further adapted to be used as a right or left handed plow and can be used with equal facility upon the hillside going in either direction as well as upon table-land.

Now, having thus described my said invention, what I claim as new, and desire to secure by United States Letters Patent, is—

1. In a plow the combination with a suitable supporting-stem of a duplex plow-point movably secured to said plow-stem, a supporting-plate extending from said plow-point and movably secured to said stem, a locking-ear secured to said plate, a duplex moldboard movably shackled to said plate and adapted to find a seating upon said duplex plow-point and lock upon said ear and a locking-bar adapted to secure said duplex moldboard and connected plow-point to said stem, substantially as and for the purpose set forth.

2. In a reversible plow the combination with a suitable main supporting-stem, said stem being provided with an upper and a lower seating, a duplex plow-point movably secured within said lower seating, said plow-point being provided with a moldboard-seating, a plate extending from said duplex plow-point upward and being movably secured to said upper seating, locking-ears extending from said plate and duplex moldboard, said moldboard being movably shackled to said face-plate, and provided with loops adapted to engage said locking-ears, said moldboard further being adapted to find a seating upon said duplex plow-point and a locking-bar secured to said stem adapted to engage said duplex moldboard, substantially as and for the purpose set forth.

CONRAD STROEBEL.

Witnesses:
AUGUST BOHM,
JOSEPH SANDHOEFNER.